UNITED STATES PATENT OFFICE.

GABRIEL BLONDIN, OF NEW YORK, N. Y.

IMPROVEMENT IN PAINT COMPOSITIONS.

Specification forming part of Letters Patent No. 11,112, dated June 20, 1854.

*To all whom it may concern:*

Be it known that I, GABRIEL BLONDIN, of the city, county, and State of New York, have invented certain new and useful Improvements in Distemper-Painting; and I do hereby declare that the following is a full, clear, and exact description of the same.

My invention is a new article of manufacture, being of the pigments commonly used in distemper-painting so prepared that the work, when finished according to my directions, may be capable of withstanding the action of water, or even of such alkaline solutions as are usually employed by housekeepers for cleansing surfaces painted with colors mixed in oils. To effect this result I avail myself of the well-known principle that albumen, though soluble in water when in its primitive state, becomes insoluble when coagulated, and I therefore prepare the pigments by adding to those reduced to powder the albumen usually found in market in the dried condition, also reduced to powder, and mixing the mass intimately by trituration or otherwise. The proportion of albumen will vary with different coloring substances—as, for instance, those of which the form of the particle is crystalline are more readily fixed than those of a globular form, and less albumen would be required. The proportion necessary for paints—the basis of which is white lead—would be, say, about one part, by weight, of albumen to sixteen or eighteen of the oxide of lead, and the mass thus formed should, when required for use, be mixed carefully with water to a due consistency and allowed to stand for a few hours, when it can be employed in the usual way for paints of this class.

To render the work permanent when exposed to the action of water it will be necessary to coagulate the albumen, and this can be effected by many well-known methods. The readiest, however, will be to brush over the surface, when it shall have become thoroughly dry, with the common alcohol of commerce, and when sufficient time shall have elapsed for the coagulated albumen to become hard—say such time as would suffice for oil-paint to become dry—the work may be safely washed with water or with soaps containing an excess of alkali. The appearance of the work will now be that known by painters as "flat," and if a gloss is desired varnishes may be employed as usual.

What I claim as my invention, and desire to secure by Letters Patent, is—

The composition of ingredients herein described, for the purpose specified.

GABRIEL BLONDIN.

Witnesses:
    S. H. MAYNARD,
    O. T. SIMMONS.